US008336949B2

(12) United States Patent
Boettcher

(10) Patent No.: US 8,336,949 B2
(45) Date of Patent: Dec. 25, 2012

(54) LINK-TYPE SLIDING DOOR MECHANISM

(75) Inventor: Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 12/851,669

(22) Filed: Aug. 6, 2010

(65) Prior Publication Data

US 2012/0031003 A1   Feb. 9, 2012

(51) Int. Cl.
*B60J 5/06* (2006.01)
(52) U.S. Cl. ............... 296/155; 296/146.12; 49/154
(58) Field of Classification Search ............... 296/155, 296/146.11, 146.12, 146.1; 49/154, 209, 49/223

See application file for complete search history.

(56) References Cited

U.S. PATENT DOCUMENTS

| | | | |
|---|---|---|---|
| 4,110,934 A * | 9/1978 | Zens ............................ | 49/218 |
| 6,183,039 B1 | 2/2001 | Kohut et al. | |
| 6,926,342 B2 | 8/2005 | Pommeret et al. | |
| 7,000,977 B2 | 2/2006 | Anders | |
| 7,393,044 B2 | 7/2008 | Enomoto | |
| 7,552,561 B2 * | 6/2009 | Schneckenleitner ............ | 49/362 |
| 7,611,190 B1 | 11/2009 | Elliott et al. | |
| 8,122,644 B2 * | 2/2012 | Jarolim ............................ | 49/209 |
| 2008/0129085 A1 * | 6/2008 | Kim et al. ....................... | 296/155 |
| 2011/0126466 A1 * | 6/2011 | Adachi et al. .................... | 49/262 |

* cited by examiner

*Primary Examiner* — Glenn Dayoan
*Assistant Examiner* — Pinel Romain
(74) *Attorney, Agent, or Firm* — Rankin Hill Clark LLP

(57) ABSTRACT

A sliding door mechanism includes an upper slide rail and a lower slide rail fixed to a vehicle side body structure. An upper slider is associated with the upper rail, and a lower slider is associated with the lower rail. An upper link includes a control arm pivotally connected to both the upper slider and a vehicle door. A lower link includes a control arm pivotally connected to both the lower slider and the vehicle door. A control mechanism is operatively associated with a selected one of the upper link and the lower link. The control mechanism includes a first control fixed to the vehicle side body structure and a second control fixed to the control arm of the selected link. Movement of the second control is based on predetermined structural constraints associated with the first control. The control mechanism controls rotation and translation of the upper and lower links.

22 Claims, 15 Drawing Sheets

LINK-TYPE SLIDING DOOR MECHANISM

BACKGROUND

Exemplary embodiments herein generally relate to a vehicle sliding door opening and closing mechanism for opening or closing a door associated with an opening of a vehicle body in a front-to-rear direction. More particularly, the present disclosure is directed to a link-type sliding door mechanism for opening and closing a door having an improved kinematic movement path.

With reference to FIGS. 1 and 2, a known sliding door opening and closing mechanism 100 for a vehicle includes lower and upper fixed arms 102,104 with a single pivot and a middle link 106. The middle link 106 can be operatively connected to a drive mechanism (not shown) for opening and closing a vehicle door 120. The vehicle door 120 can also be actuated manually through pulling on the door handle to open or close the door. Each of the lower and upper fixed arms 102,104 and the middle link 106 have a distal portion connected to the door 120 and a proximal portion operatively associated with respective lower, upper and middle guide tracks or rails 110,112,114 for slidably moving the vehicle door 120. Each guide track is attached to a vehicle side body structure 116 and extends in a front-to-rear direction of the side body structure. Generally, the lower guide rail 110 includes a rearward portion 124 and a forward portion 126, which is incorporated into the side body structure 116. Similarly, the upper guide rail 112 includes a rearward portion 128 and a forward portion 130. To open the door 120, the drive mechanism is actuated causing the middle link 106 to translate along the side body structure 116 via the middle guide rail 114. Movement of the middle link 106 causes the lower and upper fixed arms 102,104 to move along the lower and upper guide rails 110,112. The slide door is projected in a vehicle exterior direction along the curved portion 126 of the lower guide rail 110, and then the door is slidably moved to a fully opened position. In the fully opened position, a lower portion of the door is canted outwardly away from the side body structure 116. Conversely, to close the slide door 120, the door is moved toward the forward portion 126 along the rearward portion 124 of the lower guide rail 110, and then the door is pulled inward in a vehicle interior direction along the forward portion 126. This known opening and closing mechanism 100 achieves a lateral shift to the door position based on the lower and upper guide rails 124,126 that the lower and upper fixed arms 102,104 are guided by. As a result, due to the kinematic movement path of the door 120 (see FIG. 16), the vehicle body structure 116 is often compromised by the curved portion 126 of the lower guide rail 110 to accommodate the sliding door 120. The guide rail of this type disadvantageously influences the vehicle body structure. This compromised body structure can have open structural sections, rather than enclosed sections, and can suffer from poor continuity in the body structure where the opening and closing door mechanism 100 must be placed.

BRIEF DESCRIPTION

In accordance with one aspect, a sliding door mechanism for a vehicle arranged to move a door from a door opening provided in a vehicle side body structure from a closed position to an open position is provided. The sliding door mechanism comprises an upper slide rail and a lower slide rail fixed to the vehicle side body structure. An upper slider is associated with the upper rail and is movable along the upper rail, and a lower slider is associated with the lower rail and is movable along the lower rail. An upper link includes a control arm including a proximal portion pivotally connected to the upper slider to define an inside pivot and a distal portion pivotally connected to the vehicle door to define an outside pivot. A lower link includes a control arm including a proximal portion pivotally connected to the lower slider to define an inside pivot and a distal portion pivotally connected to the vehicle door to define an outside pivot. A control mechanism is operatively associated with a selected one of the upper link and the lower link. The control mechanism includes a first control fixed to the vehicle side body structure and a second control fixed to the proximal portion of the control arm of the selected link. Movement of the second control is based on predetermined structural constraints associated with the first control. The control mechanism controls rotation of the upper and lower links to laterally displace the vehicle door from the vehicle side body structure and translation of the upper and lower links to slide the vehicle door along the vehicle side body structure.

In accordance with another aspect, a sliding door mechanism for a vehicle is arranged to laterally displace a door from a door opening provided in a vehicle side body structure and translate the door along the vehicle side body structure to an open position. The sliding door mechanism comprises an upper guide rail and a lower guide rail. Each of the upper and lower guide rails is attached to the vehicle side body structure and is appropriately shaped so that no portion of the upper and lower guide rails intrude into the vehicle side body structure. An upper link includes a control arm having a first end portion operatively connected to the upper guide rail and a second end portion operatively connected to the vehicle sliding door. A lower link includes an arm having a first end portion operatively connected to the lower guide rail and a second end portion operatively connected to the vehicle sliding door. A control mechanism is connected to the vehicle side body structure and is operatively associated with a selected one of the upper link and the lower link. The control mechanism includes a cam located on the first end portion of the selected link arm. The control mechanism provides for a rotational movement of the selected link arm for displacing the vehicle sliding door and a subsequent translational movement of the selected link arm for sliding the vehicle door to the open position. The cam controls the rotation and translation of the selected link arm.

In accordance with yet another aspect, a sliding door mechanism for a vehicle is arranged to laterally displace a door from a door opening provided in a vehicle side body structure and translate the door along the vehicle side body structure to an open position. The sliding door mechanism comprises an upper guide rail and a lower guide rail. Each of the upper and lower guide rails is attached to the vehicle side body structure and is appropriately shaped so that no portion of the upper and lower guide rails intrude into the vehicle side body structure. An upper link includes a control arm having a first end portion operatively connected to the upper guide rail and a second end portion operatively connected to the vehicle sliding door. A lower link includes an arm having a first end portion operatively connected to the lower guide rail and a second end portion operatively connected to the vehicle sliding door. A control mechanism is connected to the vehicle side body structure and is operatively associated with a selected one of the upper link and the lower link. The control mechanism includes a fixed housing configured to rotatably and slidably receive the first end portion of the selected link arm. The control mechanism provides for a rotational movement of the selected link arm for displacing the vehicle sliding door and a subsequent translational movement of the selected link arm for sliding the vehicle door.

DETAILED DESCRIPTION

Figure 1:
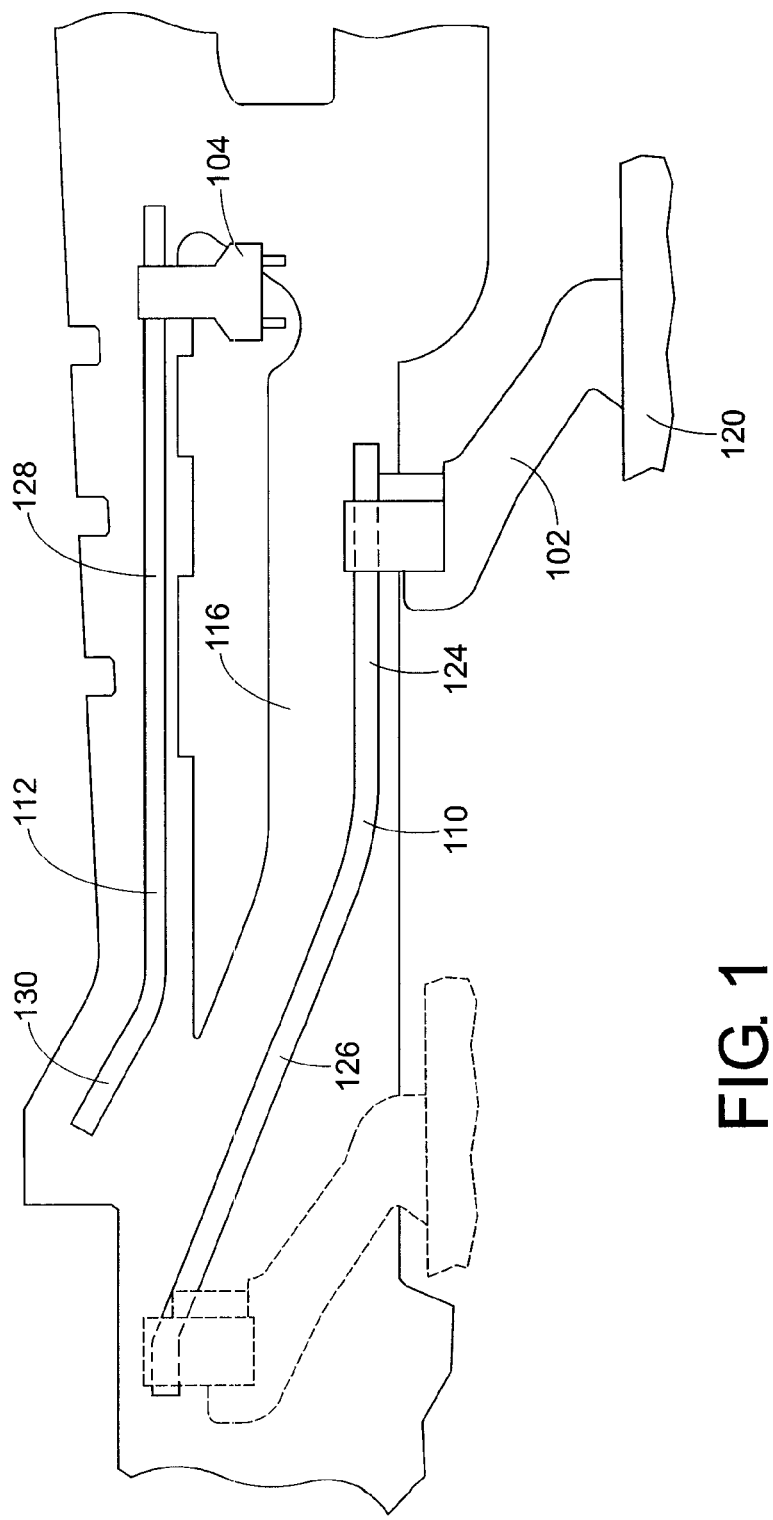
FIG. 1 is a partial schematic of a known sliding door opening and closing mechanism for a vehicle including lower and upper sliding assemblies with lower and upper fixed arms with a single pivot.
Figure 2:
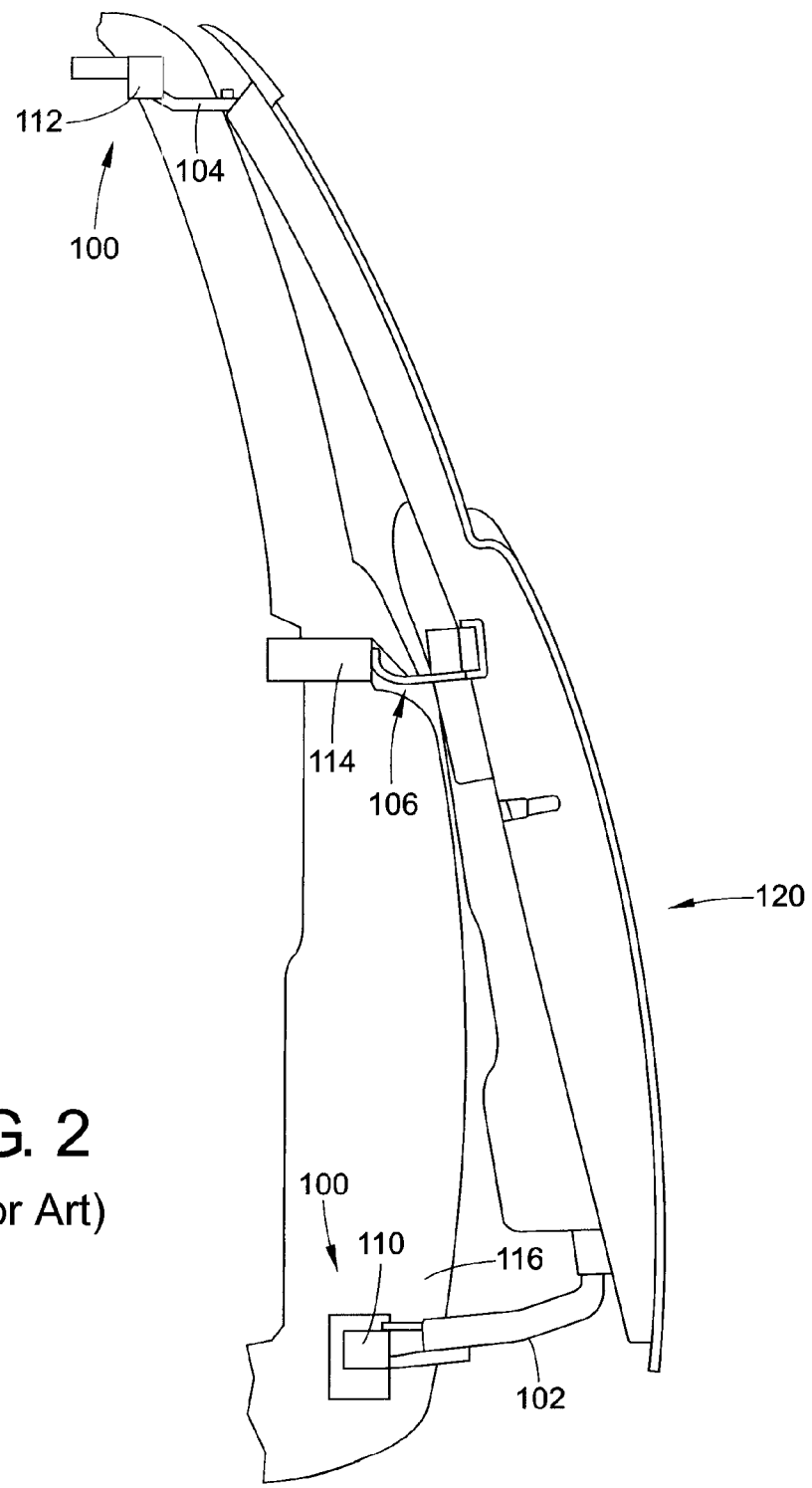
FIG. 2 is a schematic view of the vehicle door of FIG. 1 in an open position, a lower portion of the door being canted outwardly.
Figure 3:
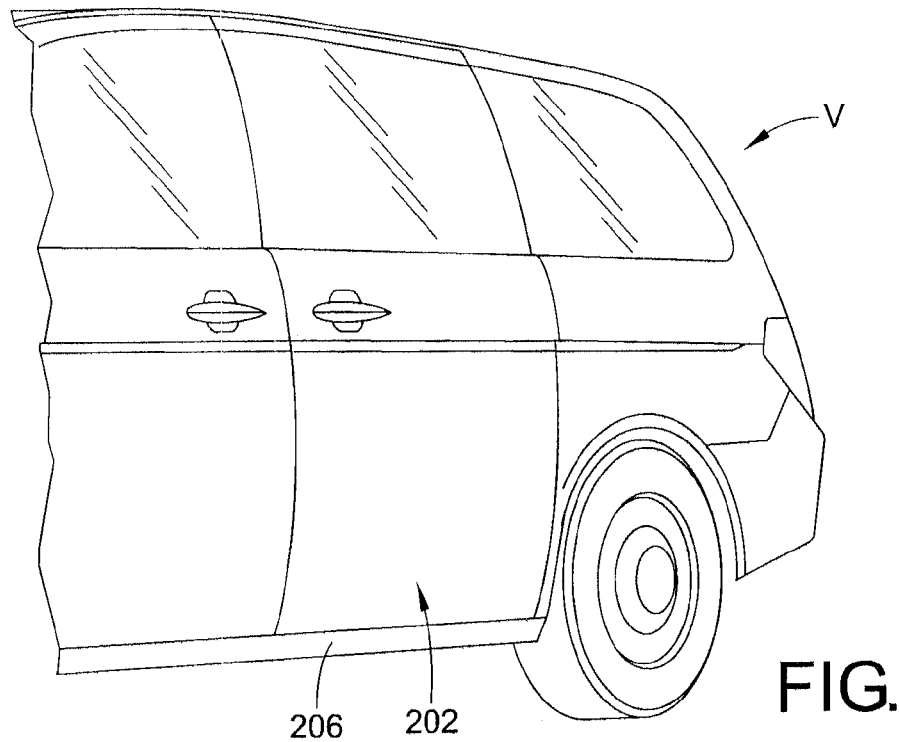
FIGS. 3 and 4 are side schematic views of a vehicle having sliding door moveable between a closed position and open position via an exemplary sliding door mechanism according to the present disclosure, in the closed position the door generally fits flush with the adjacent vehicle outer body structure of the vehicle, in the open position door is laterally displaced from the body structure.

It should, of course, be understood that the description and drawings herein are merely illustrative and that various modifications and changes can be made in the structures disclosed without departing from the present disclosure. It will also be appreciated that the various identified components of the exemplary sliding door mechanism disclosed herein are merely terms of art that may vary from one manufacturer to another and should not be deemed to limit the present disclosure. Referring now to the drawings, wherein like numerals refer to like parts throughout the several views, FIGS. 3-6 illustrate an exemplary sliding door mechanism 200 for a vehicle V according to the present disclosure. The sliding door mechanism 200 is associated with the middle link 106, which can be operatively connected to the drive mechanism (not shown) for opening and closing a vehicle door 202 in a front-to-rear direction of a vehicle side body structure 206. The vehicle door 202 can also be actuated manually through pulling on the door handle to open or close the door. The sliding door mechanism 200 is arranged to move or displace the vehicle door 202 from a closed position where the door generally lies in a first plane of a door opening 204 provided in the vehicle side body structure 206 into a second plane arranged laterally from and approximately parallel to the door plane and to slide the door in the second plane to an open position.

Figure 4:
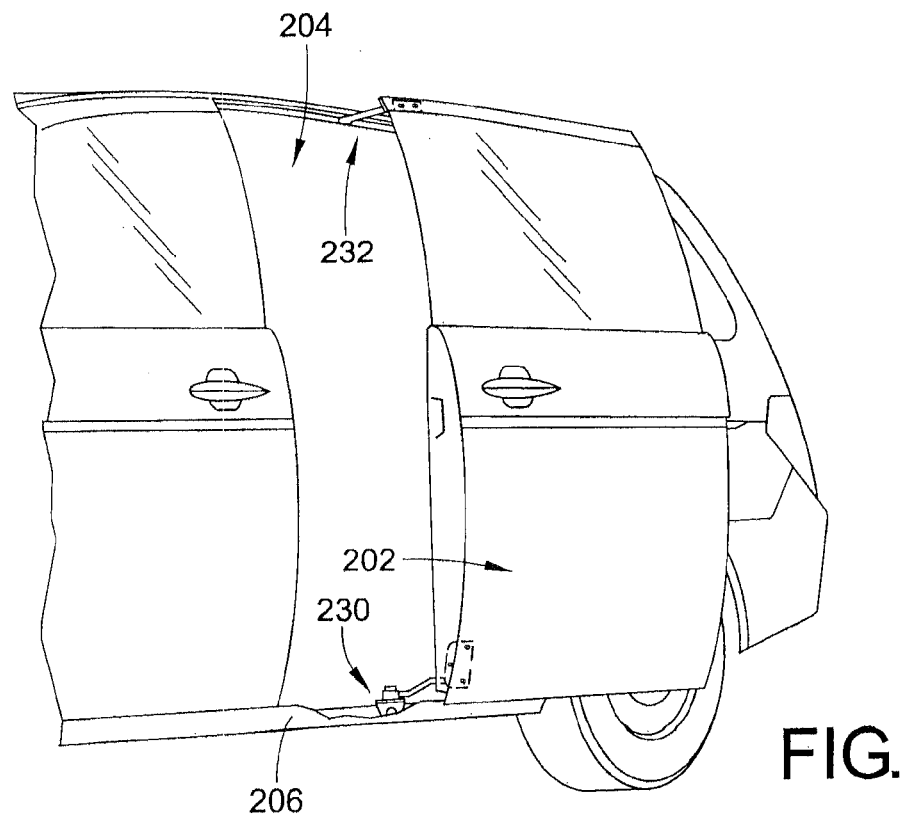
Figure 5:
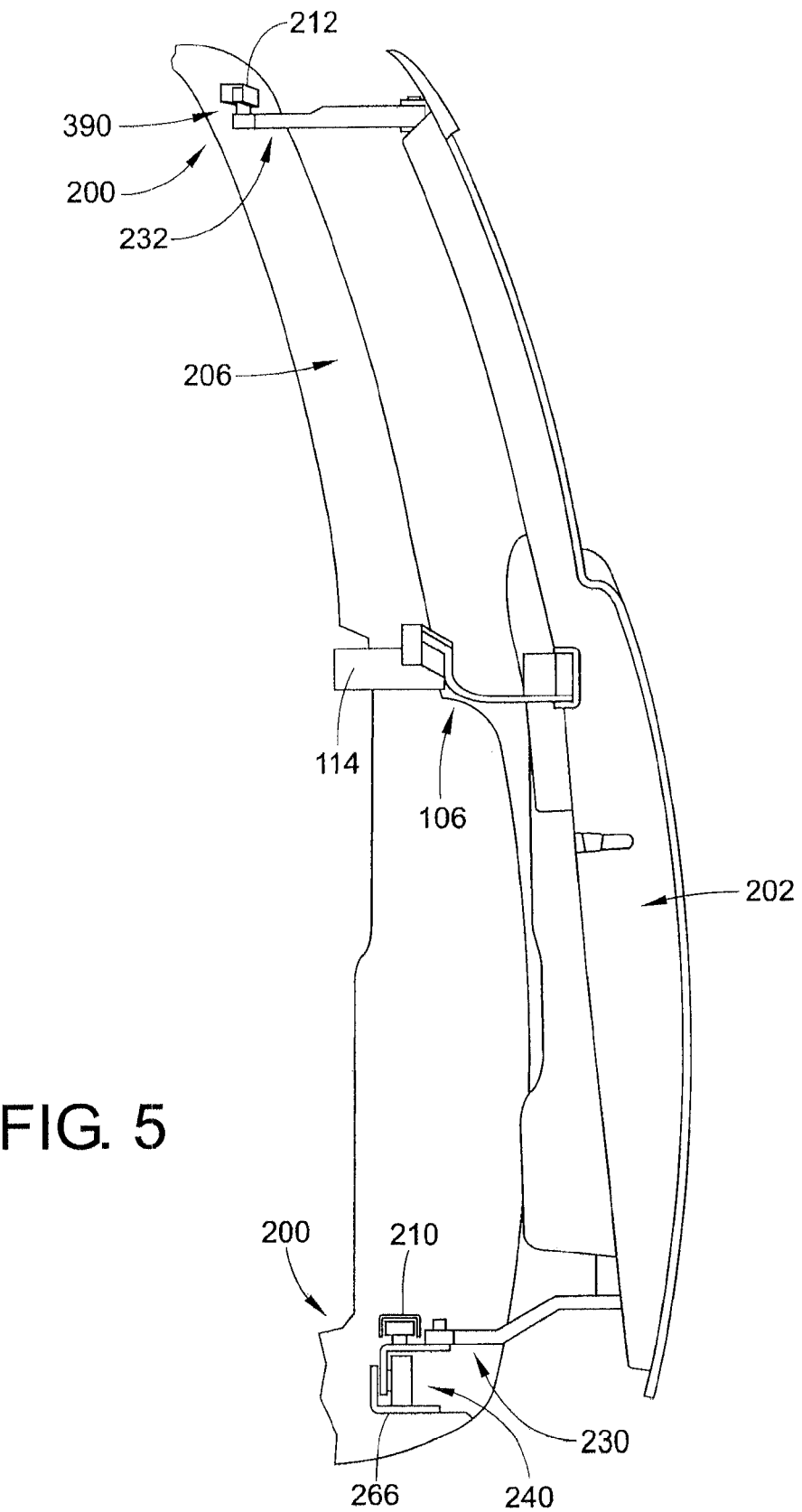
FIG. 5 is a schematic view of the vehicle door of FIG. 4.
Figure 7:
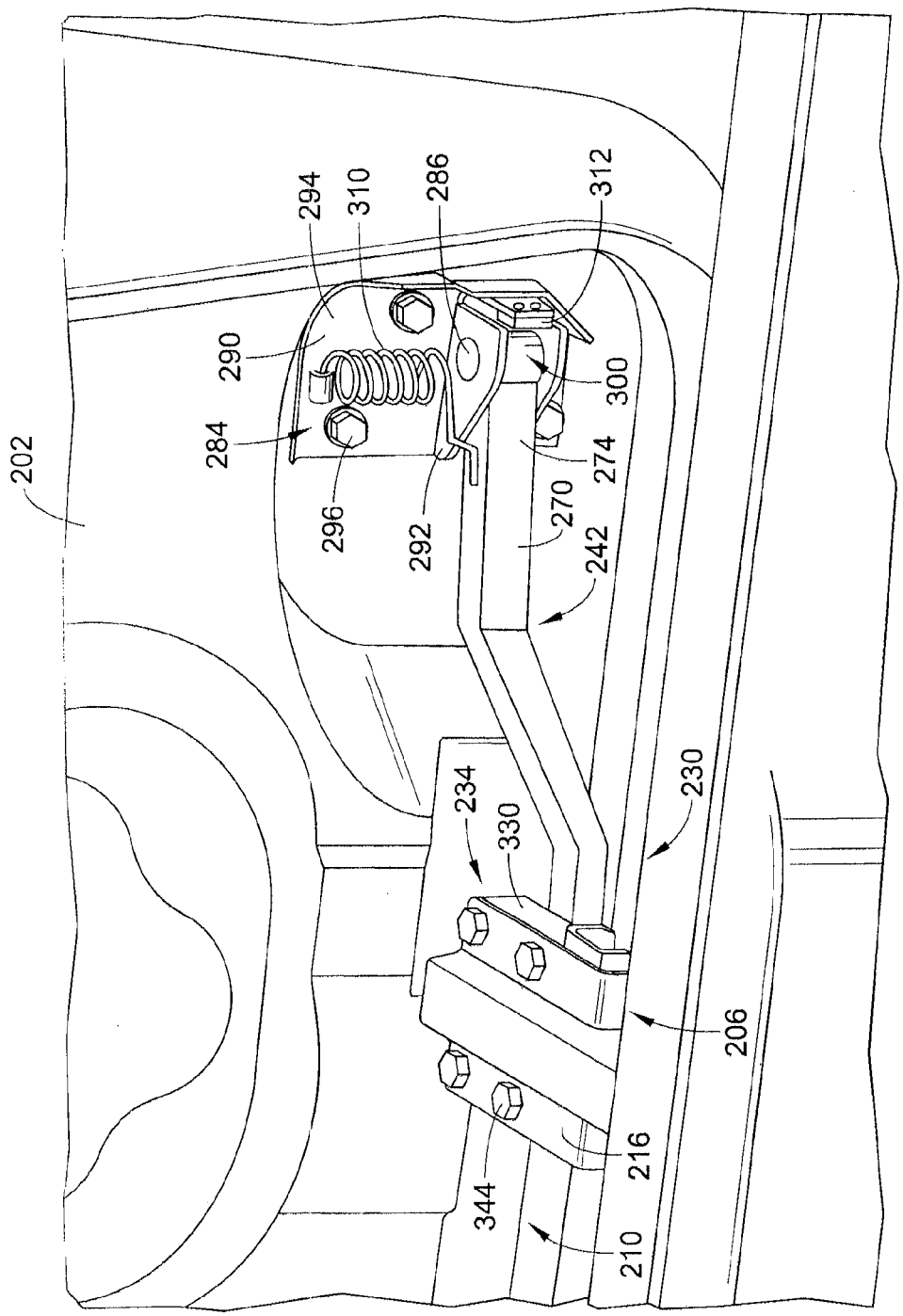
FIG. 7 is an inside perspective view of a lower sliding assembly of the exemplary sliding door mechanism of FIG. 6, the vehicle door being in the closed position.

The sliding door mechanism 200 generally comprises a lower slide rail 210 and an upper slide rail 212. Each slide rail extends in a front-to-rear direction of the vehicle side body structure 206 and is fixed to the side body structure. For example, the lower slide rail 210 is fixed to a lower side sill member 214 via support brackets 216,218,220 and the upper slide rail is fixed to an upper side sill member 222. Each of the lower and upper slide rails are appropriately shaped such that each slide rail generally conforms to the vehicle side body structure 206 so that no portion of each slide rail intrudes into the vehicle side body structure. For example, the lower slide rail 210 does not cross over to an inboard lateral side of the lower side sill member 214. Each slide rail 210,212 is disposed on an outboard lateral side of the respective side sill members 214,222. A lower sliding assembly 230 is operatively associated with the lower rail 210 and is movable along the lower rail. An upper sliding assembly 232 is operatively associated with the upper rail 212 and is movable along the upper rail. The lower and upper sliding assemblies 230,232 guide the vehicle door 202 in the front-to-rear direction. With reference to FIG. 7, a control mechanism 234 is operatively associated with a selected one of the lower and upper sliding assembly 230,232. In the depicted exemplary embodiment, the control mechanism is associated with the lower sliding assembly. In the illustrated embodiment, the control mechanism 234 controls rotation of the lower and upper sliding assemblies 230,232 to laterally displace the vehicle door 202 from the vehicle side body structure 206 and translation of the lower and upper sliding assemblies to slide the vehicle door along the vehicle side body structure. As shown in FIGS. 4 and 5, the sliding door mechanism 200 maintains the vehicle door 202 in substantially the same orientation during both laterally and longitudinally movement as the orientation of the vehicle door in the closed position.

Figure 8:
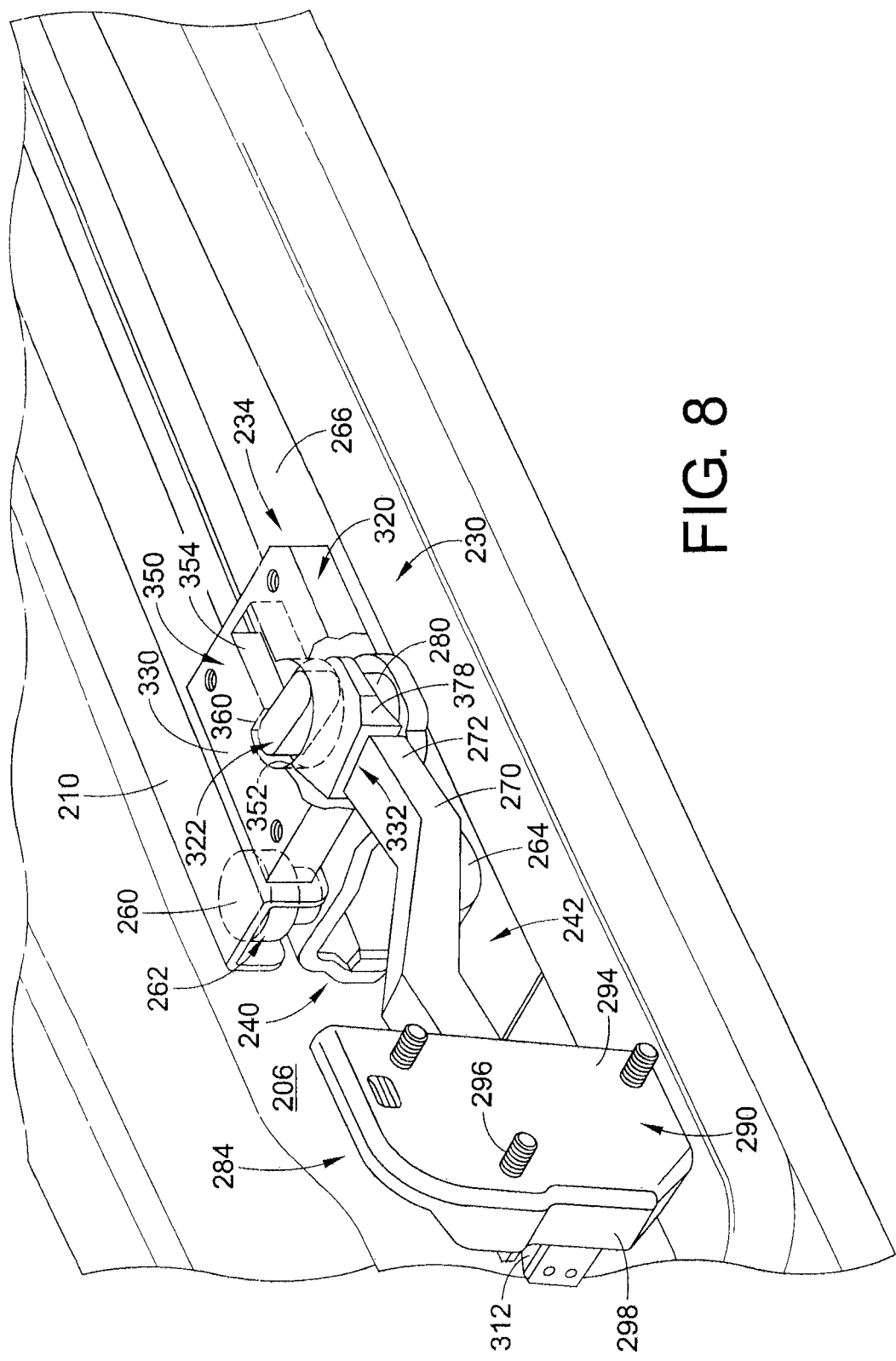
FIG. 8 is an outside perspective view of the lower sliding assembly of FIG. 7.
Figure 9:
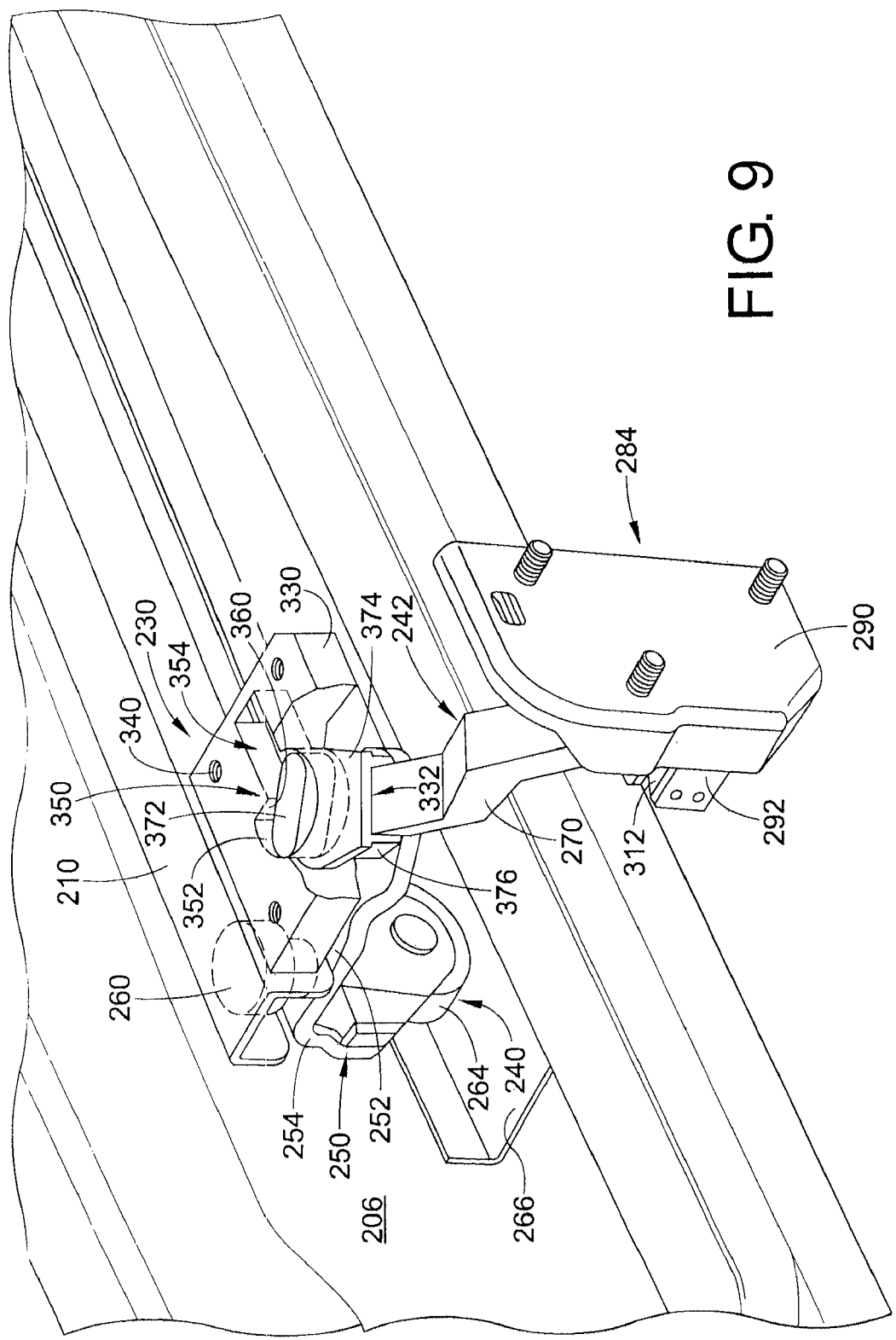
FIG. 9 is a perspective view of the lower sliding assembly of FIG. 8 as the vehicle door is being laterally displaced.
Figure 10:
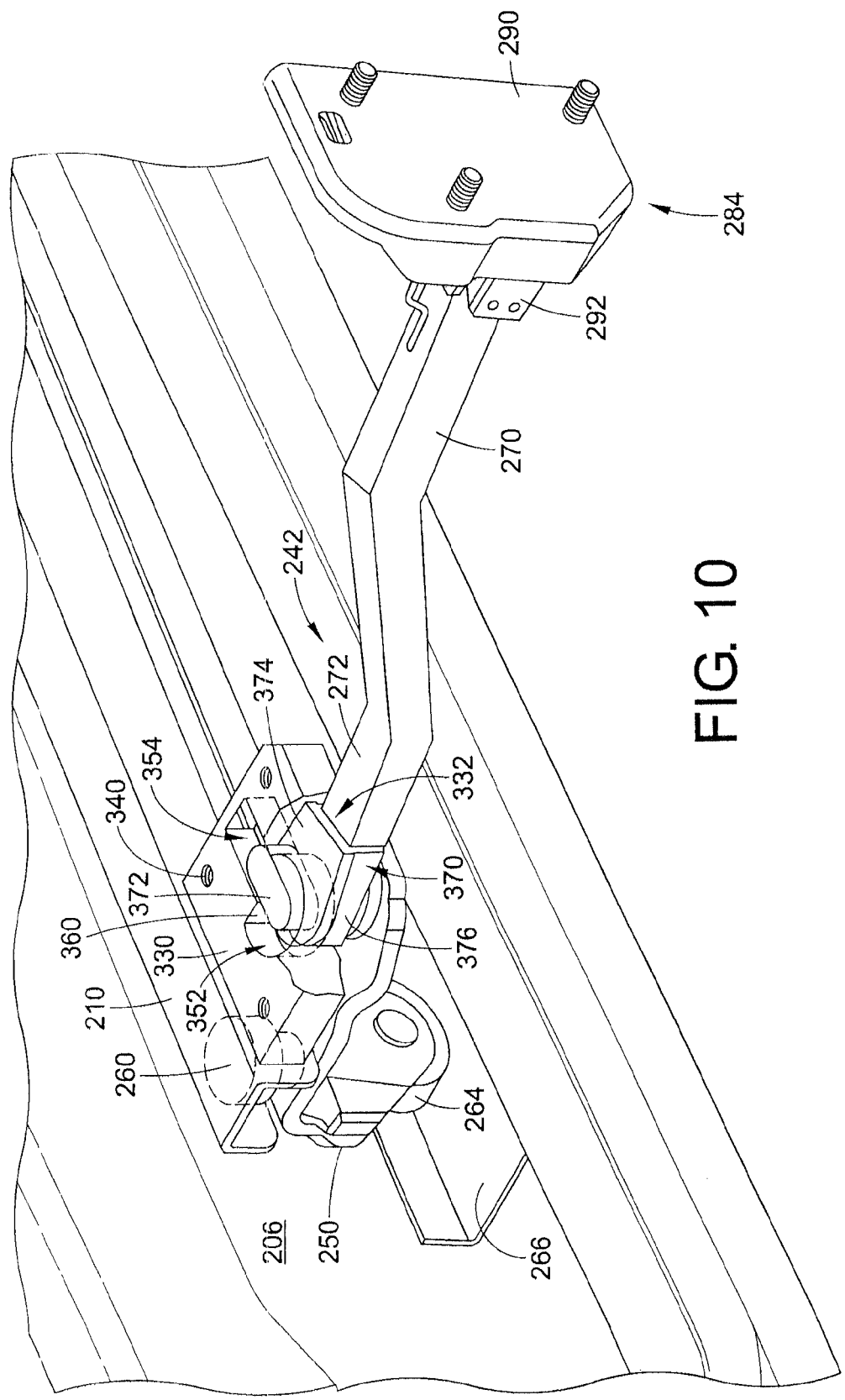
FIGS. 10 and 11 are perspective views of the lower sliding assembly of FIG. 8 as the vehicle door is being moved to the open position.

With reference to FIGS. 7 and 8, the lower sliding assembly 230 includes a lower slider 240 associated with the lower rail 210 and movable along the lower rail and a lower link 242. As seen in FIG. 9, the lower slider 240 generally includes a body 250 having a base 252 and a flange 254 extending downwardly from one (inboard) side of the base. A first roller member or wheel 260 is connected to the base 252 and is received in an elongated channel 262 defined by the lower rail 210. The first wheel 260 rotates about a generally vertical axis. A second roller member or wheel 264 is connected to the flange 242 and is movable along a track 266 that is fixed to the vehicle body structure 206. The second wheel 264 rotates about a generally horizontal axis. The roller members allow sliding movement of the lower slider along the lower rail as the vehicle door 202 is moving between the closed and open positions, and vice versa.

The lower link 242 includes a control arm 270 operatively connected to the lower guide rail 210. The control arm has a first end portion or proximal portion 272 (FIG. 8) and a second end portion or distal portion 274 (FIG. 7), which is slightly elevated relative to the proximal portion. The proximal portion 272 is pivotally connected to the lower slider 240 to define an inside pivot and the distal portion 274 is pivotally connected to the vehicle door 202 to define an outside pivot. Particularly, in the depicted exemplary embodiment, the proximal portion 272 is connected to the base 252 via a first pivot pin 280 and the distal portion 274 is connected to a bracket assembly 284 via a second pivot pin 286.

As shown in FIG. 7, the bracket assembly 284 is pivotally secured to a body structure of the vehicle door 202 and includes a first bracket member 290 and a second bracket member 292. The first bracket member 290 includes a base wall 294 that is fixed to the vehicle door 202 via fasteners, such as the illustrated bolts 296, and a side wall member 298. The second bracket member 292 is generally U-shaped and defines a channel 300 for receiving the distal portion 274 of the control arm 270 of the lower link 242. A spring 310 is associated with the distal portion 274 (i.e., the outer pivot) and the bracket assembly 284 for maintaining proper orientation of the lower link 242 during overall kinematic movement of the lower link. As depicted, the spring 310 is connected to the first bracket member 290 and a longitudinal axis of the spring is generally perpendicular to a longitudinal axis of the control arm 270. The spring 310 provides a predetermined force to maintain the vehicle door in one of the open and closed position. A zero force of the spring 310 is the point where the control arm 270 is transitioning between rotation and translation. A stopper 312 is provided on one of the bracket assembly and the distal portion of the control arm to positively control the final rotational orientation or open angle of the lower link 242 (i.e., the position of the lower link during translational movement of the vehicle door along the vehicle body particularly when the door is at the rear most position). In the depicted embodiment, the stopper is connected to the second bracket member 292.

As indicated previously, according to one exemplary aspect, the control mechanism 234 is associated with the lower sliding assembly 230 and includes a first control 320 and a second control 322. The first control 320 is fixed to the vehicle side body structure 206 and operatively associated with the proximal portion 272 of the control arm of the lower link 242. The second control 322 is fixed to the proximal portion 272 of the control arm 270. As will be described in greater detail below, movement of the second control is generally based on predetermined structural constraints associated with the first control.

With reference to FIGS. 7-10, the first control 320 includes a housing 330 which houses the inside pivot of the control arm 270. The second control 322 includes a cam 332 provided at the inside pivot and operatively supported within the housing. The housing 330 is fixedly connected to the lower rail 210 via the support bracket 216. To mount the housing to the support bracket, the housing includes threaded apertures 340 which are in registry with openings (not shown) located in the support bracket. Fasteners, such as bolts 342, extend through the openings and threadenly engage the apertures 340. Although, alternative manners for securing the housing 330 to the support bracket 216 are contemplated. It should also be appreciated that the support bracket and housing can be a unitary member. The housing 330 is configured to rotatably and slidably receive the proximal portion 272 of the control arm 270. Particularly, the structural constraints of the housing 330 includes an opening 350 shaped to allow for both rotation and translation of the cam 332. In the exemplary embodiment of the housing 330, the opening 350 is generally key-shaped and includes a first opening portion 352 and an elongated second opening portion 354. A stop 360 is associated with one of the first and second opening portion 352,354 to stop rotation of the cam 332 at a predetermined position (i.e. alignment of the cam with a longitudinal axis of the second opening, FIG. 10) within the housing 330.

Figure 6:
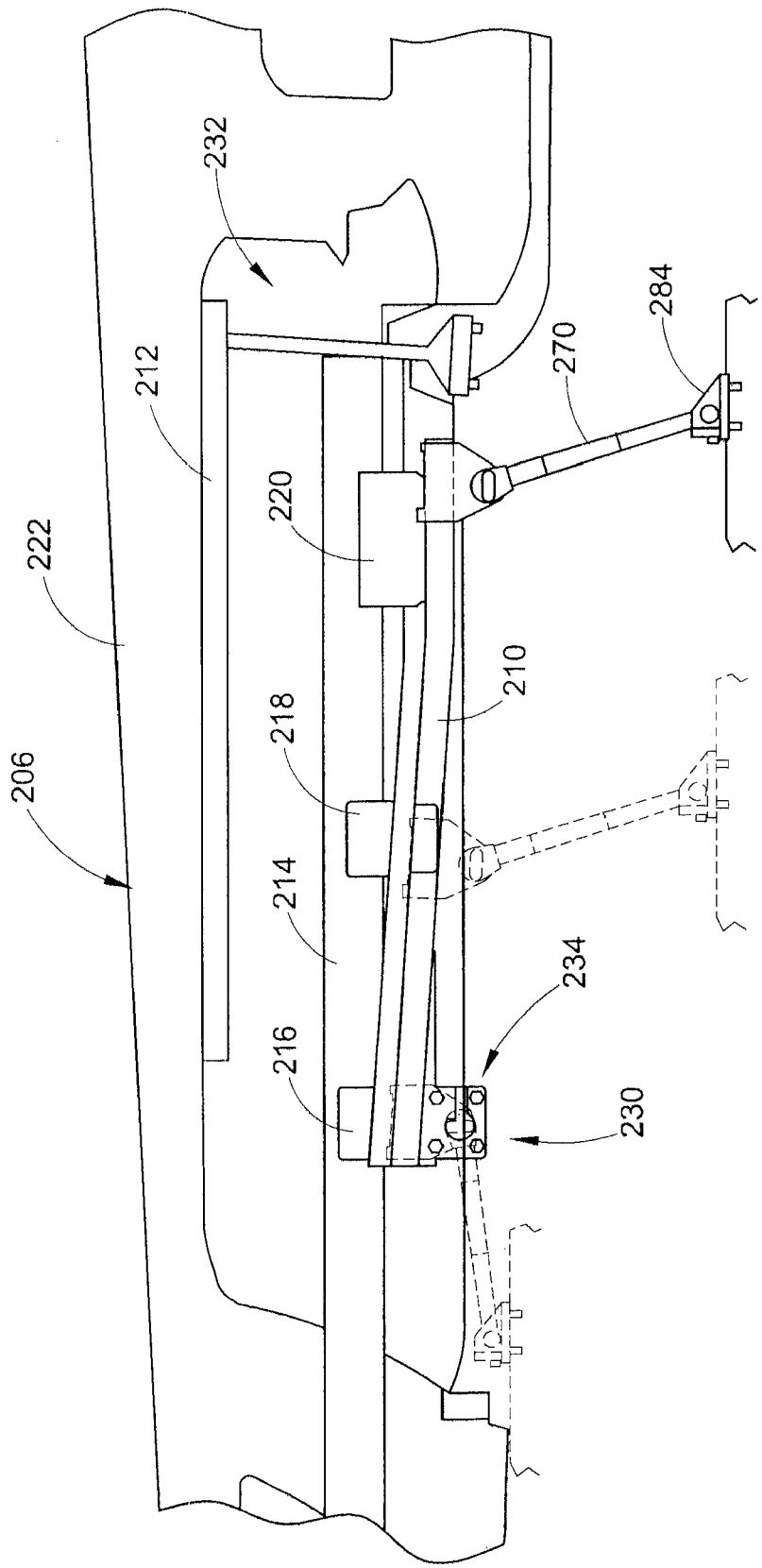
FIG. 6 is illustrates the exemplary sliding door mechanism in various positions including the closed position, the open position and an intermediate position therebetween.
Figure 11:
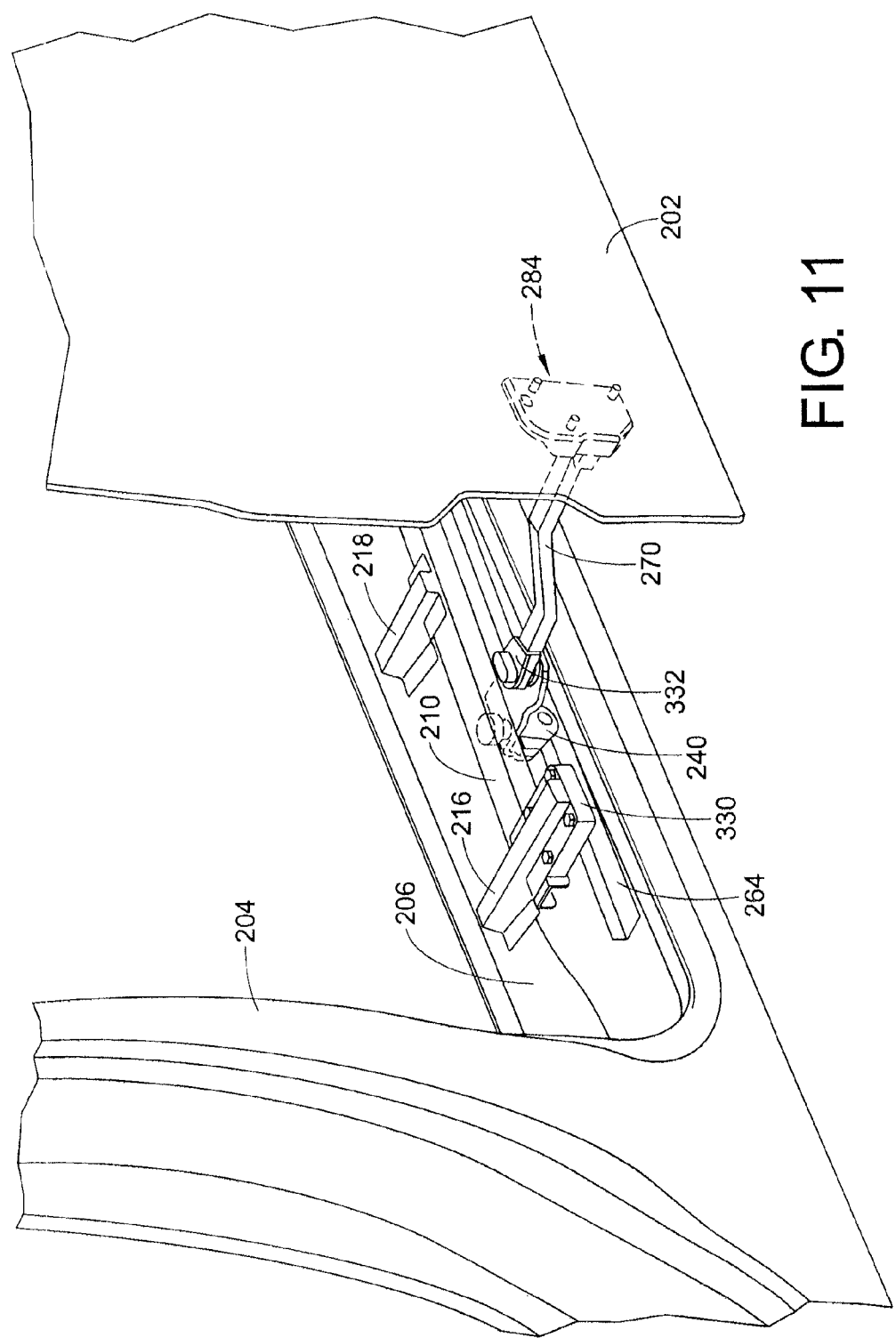

The cam 332 controls the rotation and translation of the control arm 270 based on the constraints within the housing 330 and has a first orientation within the first opening portion 352 when vehicle door 202 is in the closed position and rotates to a second orientation as the vehicle door is displaced laterally from the vehicle body structure. The cam 332 maintains the second orientation and moves with the lower link 242 as the vehicle door 202 slides along the vehicle body structure 206 to the open position (FIG. 6). The cam 332 comprises a body 370 and a generally obround guide member 372. The body 370 includes a base 374 and a pair of side walls 376,378 extending downwardly from the base. The base and side walls together define a slotted opening (not shown) dimensioned to securely receive the proximal portion 372 of the control arm 370. The guide member 372 is located on the base 374 and is operatively positioned in the housing opening 350. According to the depicted exemplary embodiment, to allow for the movement of the cam within the housing 330, the first opening portion 352 has a diameter slighter greater than a longitudinal length of the guide member 372 which allows for partial rotation of the guide member within the first opening portion 352 (FIGS. 8 and 9). The inner pivot axis of the control arm 270 defines a center axis of the first opening portion. The second opening portion 354 has a width slightly greater than a width of the guide member 372 which allows for translation of the guide member within the second opening portion 354 and out of the housing 330 (FIG. 11). According to one aspect, during movement of the cam 332 within the opening 350, an outer surface of the guide member 372 is in continuous contact with an inner surface of the housing which defines the opening 350. This yields a stable door movement condition that maintains all door opening and clearance requirements.

With reference now to FIGS. 12-15, the upper sliding assembly 232 includes an upper slider 390 associated with the upper rail 212 and movable along the upper rail and an upper link 392. The upper slider 390 generally includes a roller member or wheel 396 that is received in an elongated channel 398 defined by the upper rail 212. The roller member 396 allow sliding movement of the upper slider along the upper rail as the vehicle door 202 is moving between the closed and open positions. The upper link 392 is generally controlled by the control mechanism 230 operatively associated with the lower link 242 and serves as a guide for movement of the vehicle door 202. The upper link 392 includes a control arm 400 operatively connected to the upper guide rail 212. The control arm has a first end portion or proximal portion 402 and a second end portion or distal portion 404. The proximal portion 402 is pivotally connected to the upper slider 390 to define an inside pivot and the distal portion 404 is pivotally connected to the vehicle door 202 to define an outside pivot. Particularly, in the depicted exemplary embodiment, the proximal portion 402 is connected to the wheel 396 via a first pivot pin 410 and the distal portion 404 is connected to a bracket assembly 414 via a second pivot pin 416.

Figure 12:
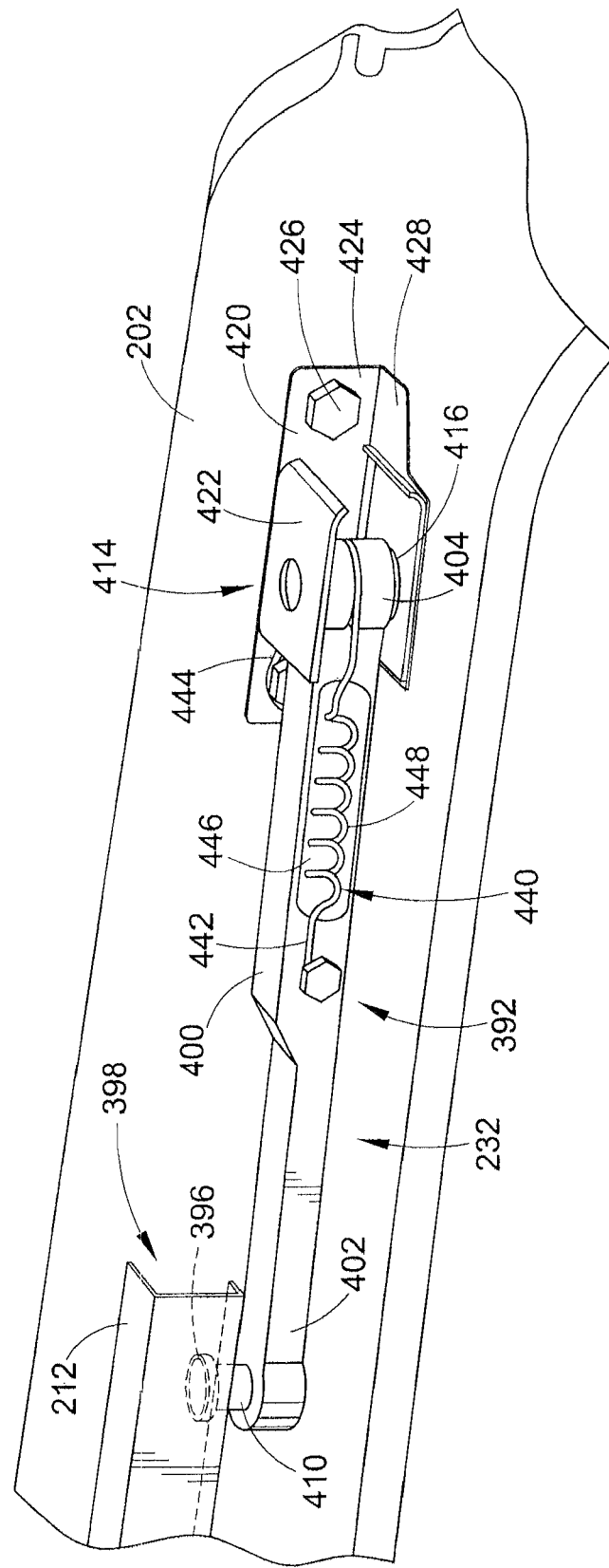
FIG. 12 is an inside perspective view of an upper sliding assembly of the exemplary sliding door mechanism of FIG. 6, the vehicle door being in the closed position.
Figure 13:
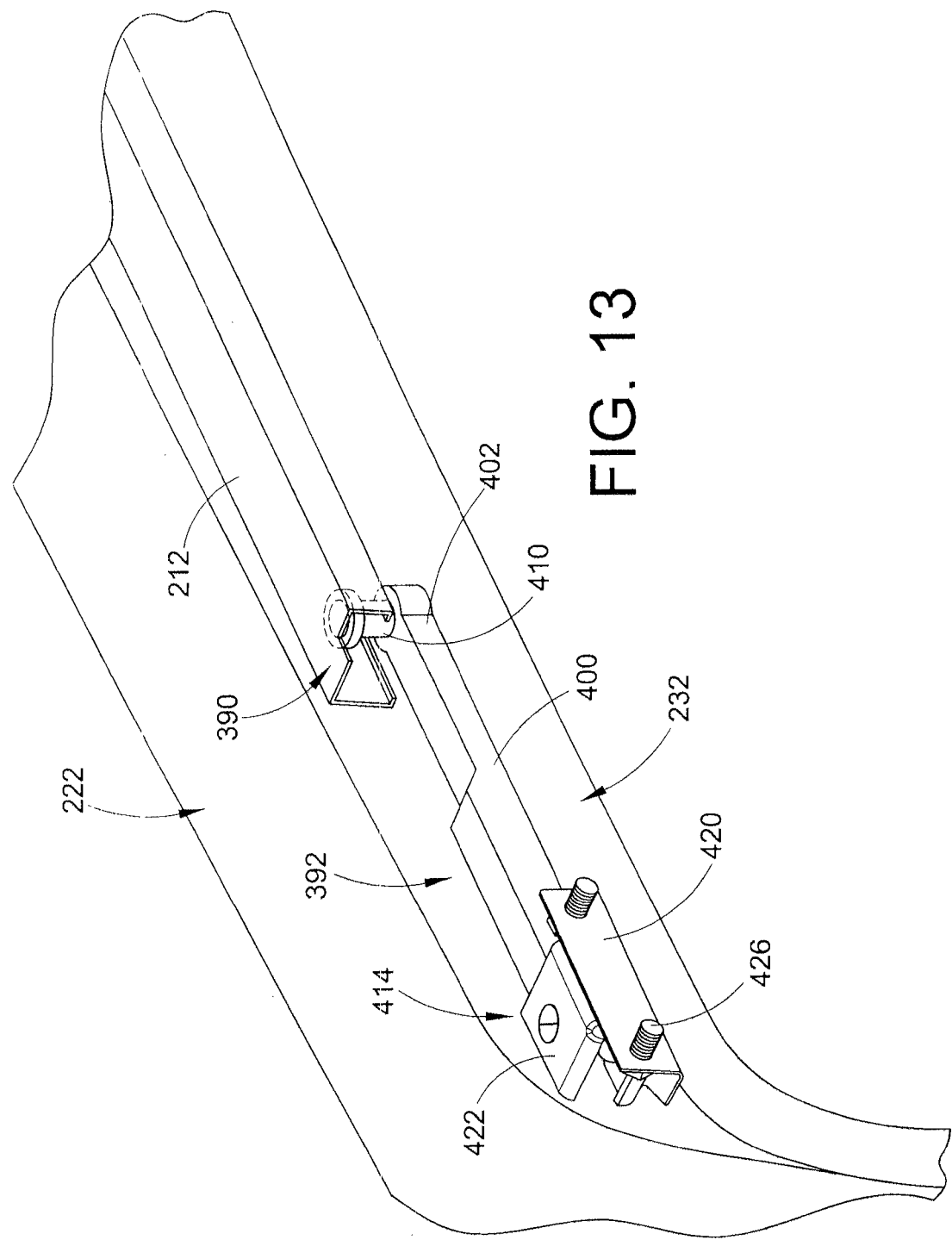
FIG. 13 is an outside perspective view of the upper sliding assembly of FIG. 12.
Figure 14:
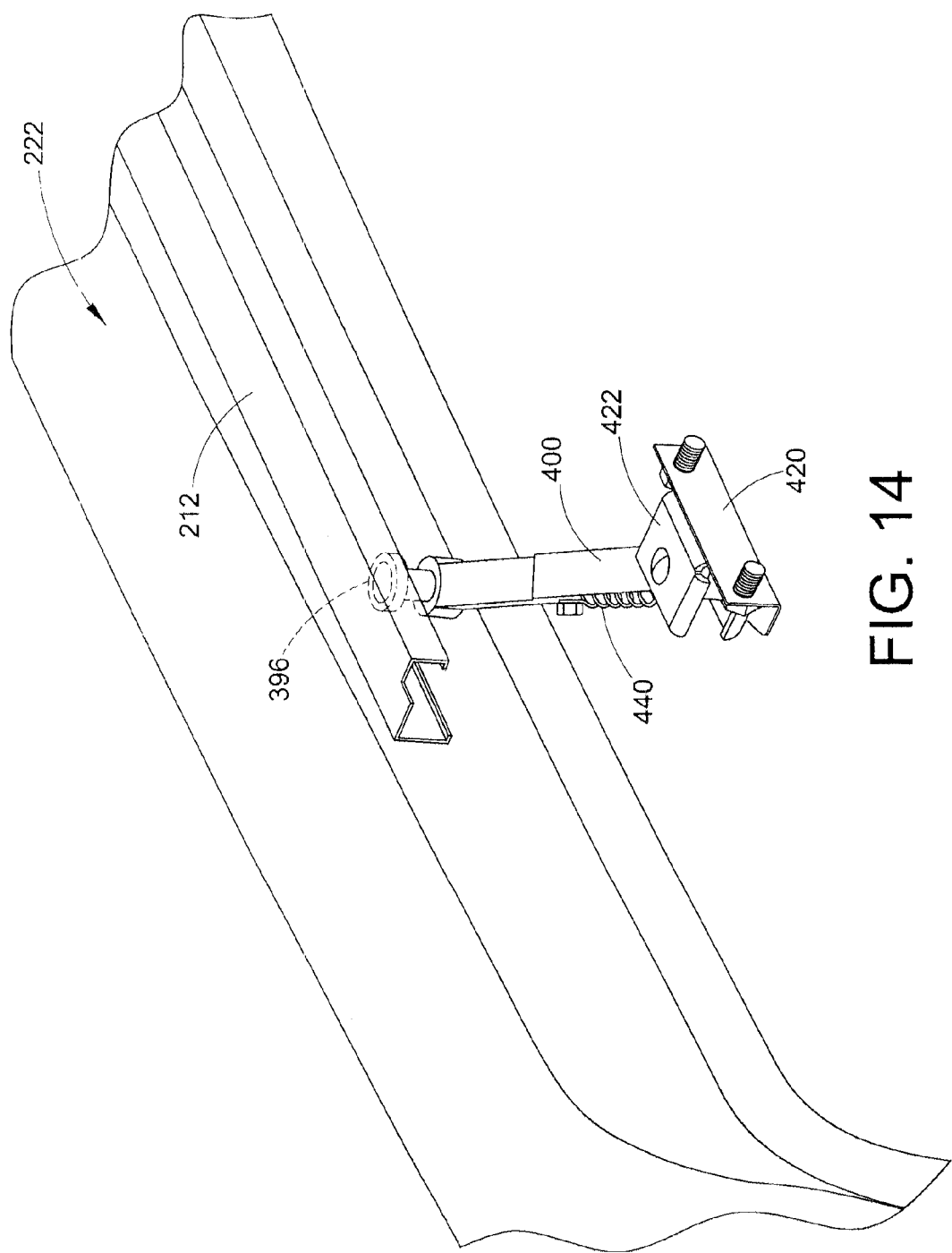
FIGS. 14 and 15 are perspective views of the upper sliding assembly of FIG. 13 as the vehicle door is being moved to the open position.
Figure 15:
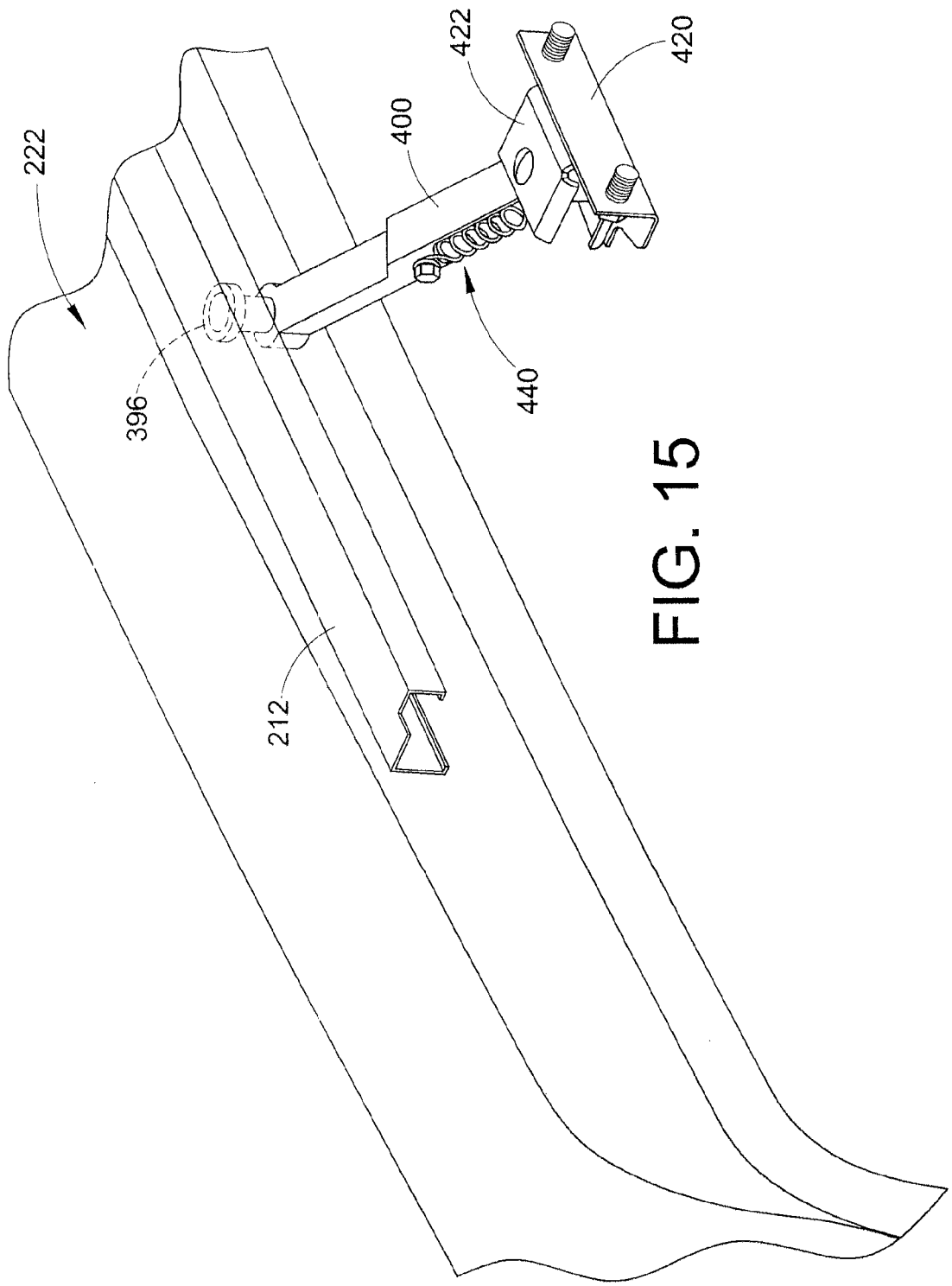

As shown in FIG. 12, the bracket assembly 414 is secured to a body structure of the vehicle door 202 and includes a first bracket member 420 and a second bracket member 422. The first bracket member 420 includes a base wall 424 that is fixed to the vehicle door 202 via fasteners, such as the illustrated bolts 426, and a side wall member 428. The second bracket member 422 is generally U-shaped and is sized to receive the distal portion 404 of the control arm 400 of the upper link 392. Similar to the lower link 242, a spring 440 is associated with the distal portion 404 (i.e., the outer pivot) and the bracket assembly 414 for maintaining proper orientation of the upper link 392 during overall kinematic movement of the upper link. As depicted, a first end 442 of the spring 440 is secured to the control arm 400 and a second end 444 of the spring is wound around the distal portion 404 and is secured to one of the bolts 426. The control arm further includes an elongated slot 446 for receiving the spring coil 448. Thus, a longitudinal axis of the spring 440 is generally parallel to a longitudinal axis of the control arm 400. The spring 440 provides a predetermined force to maintain the vehicle door in one of the open and closed position, and a zero force of the spring 440 is the point where the control arm 400 is transitioning between rotation and translation.

As is evident form the foregoing, the sliding door mechanism 200 for the vehicle is arranged to laterally displace the vehicle door 202 from the door opening 204 provided in the vehicle side body structure 206 and translate the door along the vehicle side body structure to the open position. The sliding door mechanism 200 comprises the lower guide rail 210 and the upper guide rail 212. Each of the upper and lower guide rails is attached to the vehicle side body structure 206 and is appropriately shaped so that no portion of the lower and upper guide rails 210,212 intrude into the vehicle side body structure. The lower link 242 includes the control arm 270 operatively connected to the lower guide rail 210 and the vehicle sliding door 202. The upper link 392 includes the control arm 400 operatively connected to the upper guide rail 212 and to the vehicle sliding door. The control mechanism 234 is connected to the vehicle side body structure 206 and is operatively associated with the lower link 242. The control mechanism 234 includes the fixed housing 330 and the cam 332 operatively supported within the housing. The cam 332 controls a stop point of the vehicle door by movement into the housing. The cam 332 is configured to at least partially rotate within the housing, which moves the door 202 laterally away from the vehicle body 206. The cam 332 then aligns with the opening 350 in the housing 330 which allows the cam to move out of the housing, which longitudinally moves the door along the vehicle body. The vehicle door maintains substantially the same orientation during opening (movement laterally and longitudinally) as the door in the closed position.

To open the vehicle door 202, the drive mechanism (not shown) can be actuated causing the middle link 106 (FIG. 5) to translate along the vehicle side body structure 206 via the middle guide rail 114 in a front-to-rear direction. Again, in a manual mode, the vehicle door can be actuated through pulling on the door handle. Movement of the middle link 106 causes the lower and upper links 242,392 to move along the lower and upper guide rails 210,212. While the sliding door 202 is being opened, the movement of the vehicle door is subdivided into two periods. In an initial period, between the closed position and an intermediate position of the vehicle door 202, only pivoting of the control arms 270,400 is allowed by the control mechanism 234, thereby causing the door 202 to be moved laterally away from the remainder of the vehicle. Thereafter, during a second period, between the intermediate position and the open position of the door 202, the cam 332 is aligned in the housing 330. As a result, pivoting of the control arms 270,400 is no longer allowed, and the only movement that is allowed to the sliding door 202 is movement in translation with the lower and upper sliders 240,390 moving relative to the lower and upper rails 210,212. While the sliding door 202 is being closed, the cam 332 moves back into the opening 350 of the housing 330 and translation is stopped. The only movement allowed is pivoting control arms 270,400 as the cam rotates within the housing which has the effect of moving the sliding door 202 towards the remainder of the vehicle and of closing the door.

Figure 16:
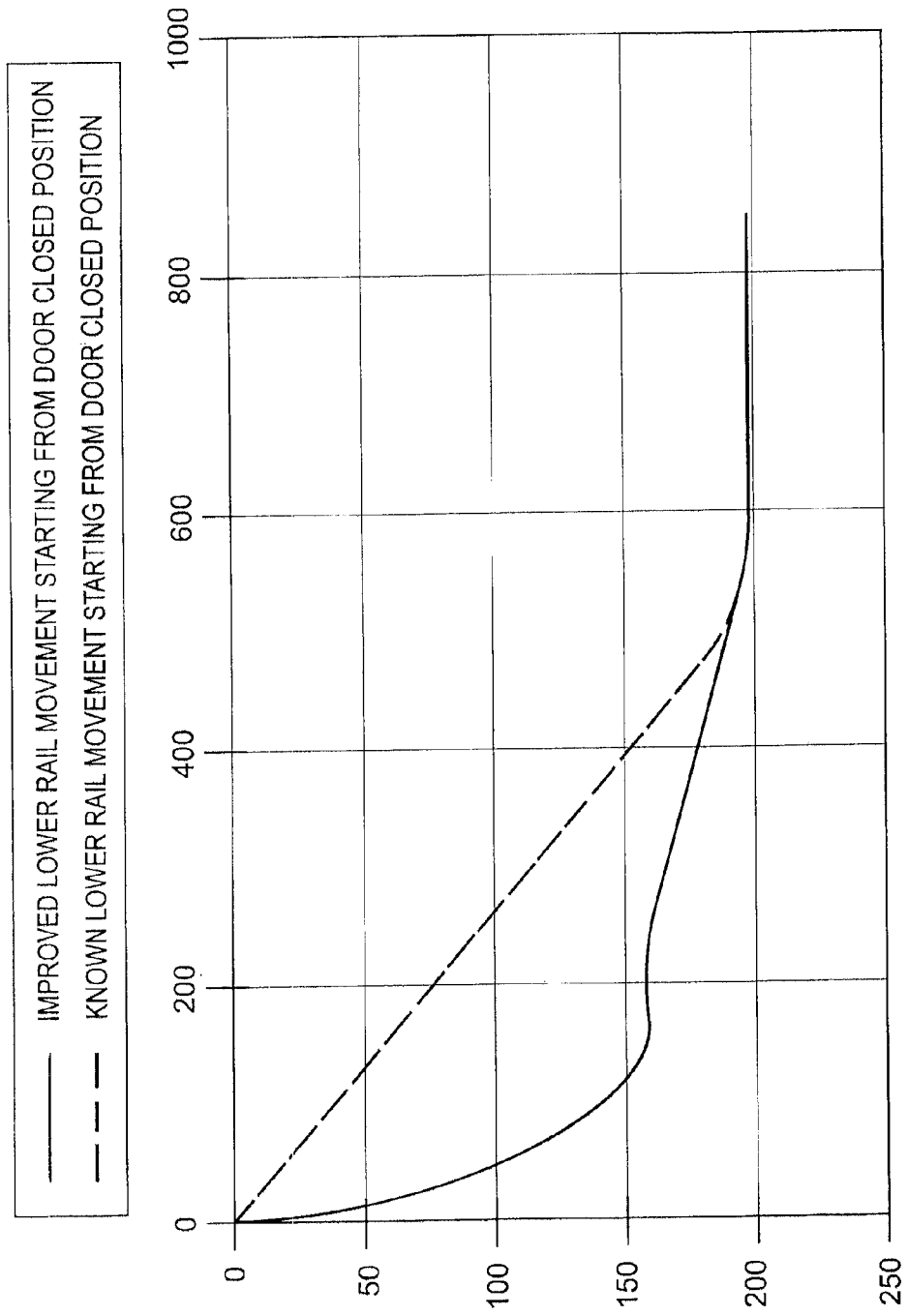
FIG. 16 graphically illustrates kinematic movement of the known lower sliding assembly and the exemplary lower sliding assembly.

The sliding door mechanism 200 uses the double pivot link on the bottom and top rails for guiding the sliding door from the closed position to the open position. The lower and upper rails 210,212 are simplified to minimize structural intrusion, resulting in a closed section for the body structure 206. Each rail 210,212 is provided along the vehicle body 206 and has a contour mirroring an outer contour of the vehicle body such that no portion of the rail intrudes into the vehicle body. The contours of the lower and upper rails 210,212 create an improved kinematic movement path of the door as compared to the known sliding door mechanism 100 (see FIG. 16). The sliding door mechanism 200 yields a stable door movement condition that maintains all door opening and clearance requirements. The pivot is provided on each end of the control arms 270,400 to obtain a small overall kinematic function and a more simplified rail layout. With the lower and upper sliding assemblies 230,232, the new kinematic path uses a rail design that does not intrude into the surrounding body structure 206.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A sliding door mechanism for a vehicle arranged to move a door from a door opening provided in a vehicle side body structure from a closed position to an open position, the sliding door mechanism comprising:
an upper slide rail and a lower slide rail fixed to the vehicle side body structure;
an upper slider associated with the upper rail and movable along the upper rail and a lower slider associated with the lower rail and movable along the lower rail;
an upper link including an upper control arm including a proximal portion pivotally connected to the upper slider to define an inside pivot and a distal portion pivotally connected to the vehicle door to define an outside pivot;
a lower link including a lower control arm including a proximal portion pivotally connected to the lower slider to define an inside pivot and a distal portion pivotally connected to the vehicle door to define an outside pivot; and
a control mechanism operatively associated with a selected one of the upper link and the lower link, the control mechanism including a first control fixed to the vehicle side body structure and a second control fixed to the proximal portion of the control arm of the selected link, rotational and translational movement of the second control being based on predetermined structural constraints associated with the first control, the control mechanism controlling rotation of the upper and lower links to laterally displace the vehicle door from the vehicle side body structure and translation of the upper and lower links to slide the vehicle door along the vehicle side body structure.

2. The sliding door mechanism of claim 1, wherein each of the upper and lower slide rails conforms to the vehicle side body structure so that no portion of each slide rail intrudes into the vehicle side body structure.

3. The sliding door mechanism of claim 1, wherein the upper link further includes a bracket secured to the vehicle door, the distal portion of the upper control arm being pivotally connected to the bracket.

4. The sliding door mechanism of claim 3, wherein a spring is associated with the upper control arm of the upper link and the bracket for maintaining proper orientation of the upper link during overall kinematic movement of the upper link.

5. The sliding door mechanism of claim 1, wherein the lower link further includes a bracket pivotally secured to the vehicle door, the distal portion of the lower control arm being pivotally connected to the bracket.

6. The sliding door mechanism of claim 1, wherein a spring is associated with the lower control arm of the lower link and the bracket for maintaining proper orientation of the lower link during overall kinematic movement of the lower link.

7. The sliding door mechanism of claim 6, further including a stopper provided on the one of the bracket and the distal portion of the lower control arm to positively control an open angle of the lower link.

8. The sliding door mechanism of claim 1, wherein the first control includes a housing and the second control includes a cam operatively supported within the housing, the cam moving with the lower link as the vehicle door slides along the vehicle body structure to the open position.

9. The sliding door mechanism of claim 8, wherein the housing includes an opening shaped to allow for both rotation and translation of the cam within the housing.

10. The sliding door mechanism of claim 9, wherein the housing includes a stop associated with the opening to stop rotation of the cam at a predetermined position within the housing.

11. The sliding door mechanism of claim 10, wherein the cam has a first orientation when vehicle door is in the closed position and rotates to a second orientation as the vehicle door is displaced laterally from the vehicle body structure, the cam maintaining the second orientation as the vehicle door is moved to the open position.

12. A sliding door mechanism for a vehicle arranged to laterally displace a door from a door opening provided in a vehicle side body structure and translate the door along the vehicle side body structure to an open position, the sliding door mechanism comprising:
    an upper guide rail and a lower guide rail, each of the upper and lower guide rails being attached to the vehicle side body structure and being appropriately shaped so that no portion of the upper and lower guide rails intrude into the vehicle side body structure;
    an upper link including an upper control arm having a first end portion operatively connected to the upper guide rail and a second end portion operatively connected to the vehicle sliding door;
    a lower link including a lower control arm having a first end portion operatively connected to the lower guide rail and a second end portion operatively connected to the vehicle sliding door; and
    a control mechanism connected to the vehicle side body structure and operatively associated with a selected one of the upper link and the lower link, the control mechanism including a cam located on the first end portion of the selected link arm, the control mechanism providing for a rotational movement of the selected link arm for displacing the vehicle sliding door and a subsequent translational movement of the selected link arm for sliding the vehicle door to the open position, the cam controlling the rotation and translation of the selected link arm.

13. The sliding door mechanism of claim 12, wherein the control mechanism further includes a housing fixed to the vehicle side body structure and operatively associated with the cam and the first end portion of the selected link arm.

14. The sliding door mechanism of claim 13, wherein the housing includes an opening having a first opening portion and a second opening portion, the cam rotating within the first opening portion to a predetermined position as the door moves laterally away from the vehicle side body structure, the cam then being aligned with the second opening portion which allows the cam to move out of the housing as the door moves along the vehicle side body structure.

15. The sliding door mechanism of claim 12, wherein the sliding door mechanism maintains the vehicle door in substantially the same orientation during both laterally and longitudinally movement as the orientation of the door in the closed position.

16. The sliding door mechanism of claim 12, wherein the upper link further includes:
    a bracket secured to the vehicle door, the distal portion of the upper control arm being pivotally connected to the bracket, and
    a spring operatively associated with the upper control arm and the bracket for maintaining proper orientation of the upper link during overall kinematic movement of the upper link.

17. The sliding door mechanism of claim 12, wherein the lower link further includes:
    a bracket pivotally secured to the vehicle door, the distal portion of the lower control arm being pivotally connected to the bracket,
    a spring operatively associated with the lower control arm and the bracket for maintaining proper orientation of the lower link during overall kinematic movement of the lower link, and
    a stopper provided on the one of the bracket and the distal portion of the lower control arm to positively control an open angle of the lower link.

18. A sliding door mechanism for a vehicle arranged to displace a door from a plane of a door opening provided in a vehicle side body structure into a second plane arranged laterally from and approximately parallel to the door plane and to slide the door in the second plane to an open position, the sliding door mechanism comprising:
    an upper guide rail and a lower guide rail, each of the upper and lower guide rails being attached to the vehicle side body structure and being appropriately shaped so that no portion of the upper and lower guide rails intrude into the vehicle side body structure;
    an upper link including an upper arm having a first end portion operatively connected to the upper guide rail and a second end portion operatively connected to the vehicle sliding door;
    a lower link including a lower arm having a first end portion operatively connected to the lower guide rail and a second end portion operatively connected to the vehicle sliding door; and
    a control mechanism connected to the vehicle side body structure and operatively associated with a selected one of the upper link and the lower link, the control mechanism including a fixed housing configured to rotatably and slidably receive the first end portion of the selected link arm, the control mechanism providing for a rotational movement of the selected link arm for displacing the vehicle sliding door and a subsequent translational movement of the selected link arm for sliding the vehicle door.

19. The sliding door mechanism of claim 18, wherein the control mechanism is associated with the lower link for controlling kinematic movement of the lower link, the control mechanism including a cam located on the first end portion of the lower link arm, the cam controlling rotation and translation of the lower link arm based on predetermined constraints associated with the housing.

20. The sliding door mechanism of claim 19, wherein the housing includes a generally key-shaped opening which allows for both rotation of the cam within the housing as the door is displaced laterally from the vehicle body structure and translation of the cam out of the housing as the door slides along the vehicle body structure to the open position.

21. The sliding door mechanism of claim 18, wherein the upper link further includes:
   a bracket pivotally connected to the second end of the upper arm and secured to the sliding door, and
   a spring connected to the upper arm and the bracket for maintaining proper orientation of the upper link during overall kinematic movement of the upper link.

22. The sliding door mechanism of claim 18, wherein the lower link further includes:
   a bracket pivotally connected to the second end of the lower arm and secured to the sliding door,
   a spring connected to the lower arm and the bracket for maintaining proper orientation of the lower link during overall kinematic movement of the lower link, and
   a stopper provided on one of the bracket and the second end of the lower arm to positively control an open angle of the lower link.

* * * * *